Oct. 8, 1935. W. LIEDLE 2,017,007
PACKING MEANS
Filed June 4, 1930
FIG. I.
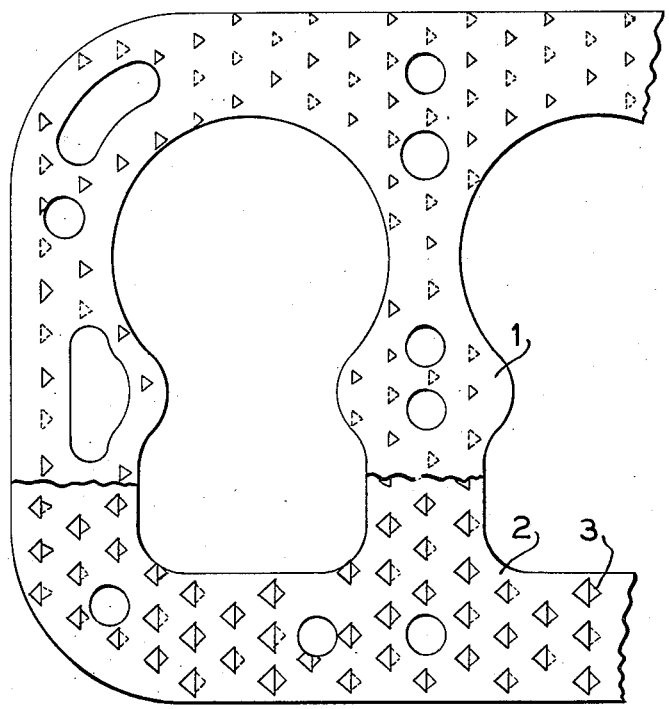
FIG. V.
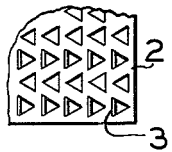
FIG. VI.
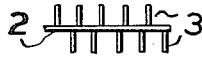
FIG. II.
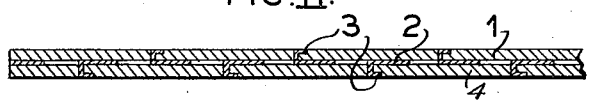
FIG. III.
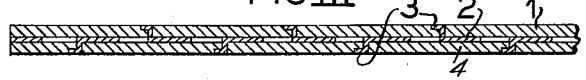
FIG. IV.
INVENTOR.
W. LIEDLE.
BY Foster + Cadier
ATTORNEYS.

Patented Oct. 8, 1935

2,017,007

UNITED STATES PATENT OFFICE 2,017,007

PACKING MEANS

Wilhelm Liedle, Cannstatt, Germany, assignor, by mesne assignments, to Detroit Gasket & Mfg. Co., Detroit, Mich., a corporation of Michigan Application June 4, 1930, Serial No. 459,165
In Germany November 13, 1929

1 Claim. (Cl. 288—1)

The present invention relates to a new and improved packing means and a process for making the same.

Specifically, the packing means manufactured according to the present invention relates to that type of packing means in which a metal layer is interposed between layers of a flexible, elastic packing material and which interposed metal layer has upon its surface projections or prongs which penetrate the flexible elastic packing material, whereby it is inseparably fastened to the intermediary metal layer.

The packing means, however, manufactured according to the present invention differentiates from the hitherto known packing means in at least two important points, viz., first, the projections or prongs which extend at right angles from the metal intermediary layer and which penetrate the packing material proper to the outer surfaces thereof are turned or bent over so that they extend at right angles to the direction of their main portion which is embedded in the packing material proper, and thus they lie in the plane of the outer surfaces of the packing material; second, the intermediate layer being composed of a metal and having the aforementioned projections or prongs which penetrate to the outer surface of the flexible, elastic material imparts a high heat conductivity to the finished packing means and consequently heat may escape more readily through the packing material than if it were made wholly from asbestos, rubber or the like, since a continuous surface to surface metallic conduit is thereby provided. It will be seen that this latter mentioned property of comparatively high heat conductivity is of great importance, since overheating of motors or other devices in which the packing is used will be greatly retarded.

In order to more fully explain a preferred embodiment of my invention, reference is made to the drawing in which similar reference characters refer to similar parts, but it is to be clearly understood that the invention is in nowise limited to the specific structures shown by the drawing and described as follows.

Figure I represents a plan view of a gasket, showing the manner in which the projections or prongs are bent over in the finished gasket. In this view a portion of the upper layer of packing material has been removed, as indicated by the broken line.

Figure II is a vertical section of the gasket shown in plan view in Figure I, in which the disposition of the intermediary metal layer is shown, and also the manner in which the outer portion of the nibs or teeth are bent over so that they lie in the plane of the outer surfaces of the gasket.

Figure III is a vertical section such as shown in Figure II except that the outer portion of the teeth or nibs are bent in the opposite direction to that shown in Figure II.

Figure IV is a vertical section of a third modification showing an arrangement of projections or prongs which, upon the upper and lower surfaces of the metallic layer, are in staggered relation with respect to each other.

Figure V shows a plan view of a portion of the modification corresponding to Figure IV.

Figure VI is a portion of the metallic intermediary layer in a side elevation of the projections or prongs mentioned above in connection with Figure IV.

In the drawing 1 represents the packing material which may be asbestos, rubber or any known packing material having the necessary properties of elasticity and flexibility.

2 is the interposed metallic layer having prongs 3 projecting upwardly therefrom at right angles, their upper portion being again bent at right angles in such a manner that they lie in the outer surface of the completed gasket. The reference character 4 also designates packing material.

In the manufacture of my novel packing means, I may subject a sheet of metal to any suitable mechanical operation such as stamping or casting, whereby triangular shaped projections are formed which extend from the two surfaces of the metal at right angles therefrom. In a preferred form of this layer of metal, the triangular projections lie in straight lines, the said lines extending from the upper surface being in vertical alignment with respect to those extending from the lower surface and alternate projections or prongs in the same straight line extending upwardly and downwardly. The triangular projections are urged through a layer of flexible, elastic material such as rubber, asbestos or the like until the inner surfaces of the said flexible, elastic layers are in intimate contact with the surfaces of the metallic layer. The ends of the projections or prongs which extend beyond the outer surfaces of the said flexible, elastic material are then bent over, preferably at right angles to their original direction, although they may be bent over at a slightly greater angle. In bending these ends of the triangular prongs the procedure may be such that a vertical section through the vertices of the bent over ends would cut out U-shaped metal sections, or the upper or lower end portions may be bent so that a vertical section as above would give Z-shaped metallic sections. In other words, the bent-over triangular end portions may lie in the outer surfaces of the completed gasket in such a manner that their vertices point in the same or in opposite directions.

Another modification of my improved packing means comprises an intermediary metallic layer having projecting prongs which on the upper surface are in staggered relation to those in the lower surface, as shown in Figures IV, V and VI. In this modification also the ends of the prongs may be bent so that their vertices extend in the same or opposite directions.

Instead of being triangular shaped the projections may be any desired shape such as, for example, needle-shaped.

Having fully disclosed my invention and the best manner of performing the same, what I claim is:

A gasket comprising a metal layer and substantially coextensive cushion material layers on opposite sides thereof, said metal layer having a multiplicity of closely spaced projections struck out from opposite sides thereof, embedded in said cushion material layers and having their ends bent over to lie within the plane of the surface thereof, forming metallic barriers substantially throughout the entire area of the gasket, said projections being arranged in longitudinal and transverse rows extending at substantially right angles to each other, the projections in a longitudinal row being all struck to extend on the same side of the sheet, and alternate longitudinal rows having the projections extending from opposite sides of the sheet, the projections of each transverse row extending alternately from opposite sides of the sheet.

WILHELM LIEDLE.